A. H. WEGENER.

NUT LOCK.

APPLICATION FILED JUNE 17, 1916.

Reissued Apr. 24, 1917.

14,291.

Witness
E. A. Jarvis
H. Dorsey Spencer

Inventor
Arnold Heinrich Wegener
By his Attorneys
Newell & Neal

THE NORRIS PETERS CO., PHOTO-LITHO., WASHINGTON, D. C.

UNITED STATES PATENT OFFICE.

ARNOLD HEINRICH WEGENER, OF HOBOKEN, NEW JERSEY, ASSIGNOR TO ROLLER LOCK NUT COMPANY, INC., A CORPORATION OF NEW YORK.

NUT-LOCK.

14,291. Specification of Reissued Letters Patent. Reissued Apr. 24, 1917.

Original No. 1,093,666, dated April 21, 1914, Serial No. 773,944, filed June 16, 1913. Application for reissue filed June 17, 1916. Serial No. 104,287.

*To all whom it may concern:*

Be it known that I, ARNOLD HEINRICH WEGENER, a citizen of the United States, and a resident of Hoboken, in the county of Hudson and State of New Jersey, have invented a new and Improved Nut-Lock, of which the following is a full, clear, and exact description.

This invention relates to nut locks of an automatic nature.

Among the objects of the invention is to provide an automatically gripping device for locking a nut to a bolt but which will permit the unscrewing of the nut under force applied thereto by means of a wrench or the like without seriously damaging either the nut or the bolt thread.

The foregoing and other objects of the invention will hereinafter be more fully described and claimed and illustrated in the drawings forming a part of this specification in which like characters of reference indicate corresponding parts in all the views, and in which—

Figure 1:
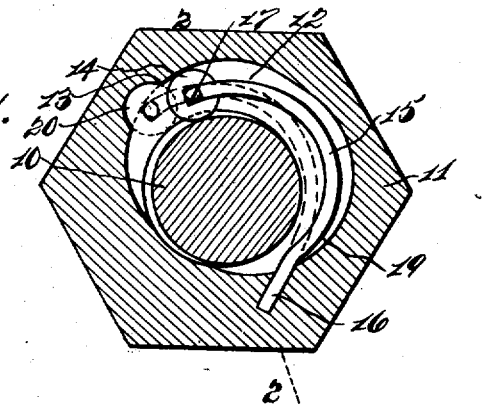
Figure 1 is a transverse section of a bolt and its nut on the line 1—1 of Fig. 2, and showing the locking device in normal position.

In carrying out this invention in a practical embodiment, I provide a bolt 10 having the usual form of thread and a nut 11 therefor having on either of its faces, herein shown as its inner face, a cavity 12. This cavity 12 is or may be substantially crescent-shaped and may be formed by a rotary milling cutter of any suitable form, the radius of which is larger than the radius of the bolt. The cavity which I prefer to make, however, in this connection, is preferably oblong or formed by the merging of two crescent-shaped cuts.

By virtue of the formation of the cavity 12 as just described there is provided adjacent one end thereof a tapering space 13 in which a roller 14 is normally fitted and so held by a spring 15. One end 16 of the spring is secured in the wall of the cavity 12, preferably at the end thereof opposite the roller. The other end of the spring is provided with a stud 17 upon which is journaled said roller 14, and adjacent the roller is a shoulder 18 adapted to bear against the periphery of the roller. The spring, therefore, has two points or places of contact or engagement with the roller which increases the desired friction and also the strength and reliability of the spring. The intermediate portion 19 of the spring is bow-shaped and extends practically throughout the length of the cavity 12 and normally spaced from both the outer wall of said cavity and the bolt. The normal tendency of said spring is to hold the roller in contact with both the bolt and the wall of the cavity 12 so that when the nut tends to turn in the direction of the arrow in Fig. 1, the tendency will be resisted by the roller riding into the narrower portion of the space 13. Movement of the nut in the other direction, however, is not resisted because the roller turns freely so as to be received in the wider portion of the space or cavity 12.

Figure 2:
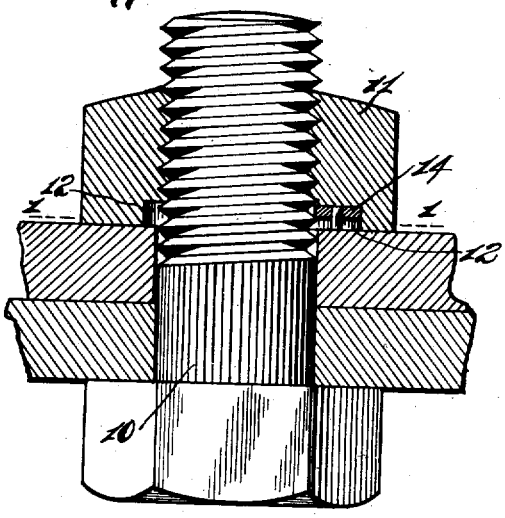
Fig. 2 is a vertical section substantially on the line 2—2 of Fig. 1.

In devices of this character in which the locking means is substantially hidden from view when the device is applied as shown in Figs. 1 and 2, it sometimes occurs that an operator or workman, not being aware of the fact that the nut is locked, will attempt to unscrew it, causing damage to the thread or breakage of some part. In order to prevent this objection and also to make it comparatively easy for the nut to be removed, yet without interfering with the desired effect of the automatically locking of the nut, I provide a pocket 20 in the tapered end 13 of the socket and into which the roller may drop so as to be out of gripping engagement with the thread of the bolt when the nut is turned under force for unscrewing it. The roller ordinarily is made hard enough so that the nut may be unscrewed as just stated, the roller biting or digging deeply enough into the threaded part of the bolt to permit this action but without doing serious damage to the thread or any other part of the device.

Figure 4:
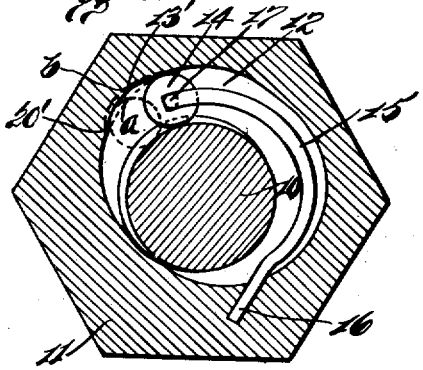
Fig. 4 is a view corresponding to Fig. 1 but indicating a slight modification.

In Fig. 4 is shown a modification in which instead of using a pocket as a means for controlling the gripping movement or operation of the roller, I provide a space 13′ which has slightly less taper than the corresponding space in Fig. 1, but which is terminated by a shoulder 20′ constituting a positive stop for the roller and enabling me to unscrew the nut under force and yet giving sufficient wedging or binding action under normal conditions to prevent the nut from working loose of its own accord. The dotted line *a* in this figure represents the curvature of the complete arc corresponding to the curve 13 in the previous figure. The dotted line *b* in this figure indicates a line concentric with the axis of the bolt and the purpose of this line is to show the degree of taper above referred to and indicated at 13′.

Figure 5:
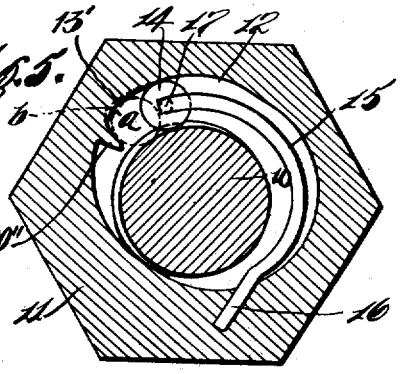
Fig. 5 is a similar view indicating a further modification.
Figure 3:
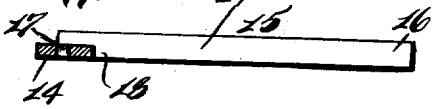
Fig. 3 is a sectional view of the gripping roller and the spring holder for the same.

Fig. 5 shows a slight variation in the form of the stop 20″ which is more positive in its action than the stop or shoulder 20′ of Fig. 4. The taper 13″, however, is substantially the same as in the preceding figure and the action likewise is substantially the same with respect to the roller and means for controlling it.

As hereinabove pointed out, the spring 15 is of such length and is normally so spaced both from the outer closed side and from the inner open side of the cavity 12 in the assembled nut, that it holds the roller 14 in the tapered end 13 of the cavity 12, the spring extending practically throughout the length of the cavity 12 and the tapering space 13 being provided adjacent one end of said cavity. Thus, the spring 15 tends to restore the roller 14 to its position in this tapering space, both when it has been moved into the enlarged part of the cavity 12 and when it has been moved into the pocket 20 or the space 13′.

The feature of the construction of the nut just described is of great practical advantage in that it permits the use of the nut in the same manner as an ordinary nut. In other words, if the nut has been partially unscrewed under force, thus causing the roller to be moved over into the cavity 20, it can be again screwed up without withdrawing it from the bolt, and the action of the spring 15 in tending to maintain the roller 14 in the tapering space 13 will cause the roller to bite the thread and to be moved again into the cavity 12 and therefore into position to lock the nut against unscrewing, except under force. Moreover, when removed from the bolt, the nut can be used again without any attention from the one who uses it, the spring 15 automatically restoring the roller 14 to operative position. The spacing of the spring 15 from the open and closed sides of the recess or cavity 12 permits the spring to be tensioned in either direction, that is, when the roller 14 is moved to either side of the tapering space 13.

Having thus described my invention, I claim as new and desire to secure by Letters Patent:—

1. The combination with a threaded bolt, of a nut having a recess extending along the thread thereof, said recess having between deeper portions a portion of reduced depth, a locking roller in said recess cooperating with said reduced portion thereof to lock said nut to said bolt but movable past said reduced portion when said nut is forcibly turned, and a spring carried by said nut and tending constantly to hold said roller in locking position, said spring being connected to said roller and so mounted in said nut that it may be moved with said roller into the unlocking position of the latter.

2. The combination with a threaded bolt, of a nut having a recess extending along the thread thereof, said recess having between deeper portions a portion of reduced depth, a locking roller in said recess adapted to cooperate with said reduced portion from either side thereof to lock said nut to said bolt but movable past said reduced portion when said nut is turned with force, and means causing such locking action, said means comprising a spring carried by the nut and constantly connected with the roller.

3. The combination with a threaded bolt, of a nut having a recess adjacent to and extending along the thread of the bolt, said recess having an intermediate reduced portion, a locking roller located in said recess and adapted to engage between said reduced portion thereof and said bolt to lock said nut against unscrewing but movable past said reduced portion when said nut is forcibly unscrewed, and a spring connected to said roller and so located in the nut that it is tensioned by movement of said roller to either side of said reduced portion.

4. A nut having the usual threaded bolt receiving opening and having a recess extending along the thread thereof, said recess having between deeper portions a portion of reduced depth, a locking roller of a diameter greater than the depth of the reduced portion of said recess, and a spring connected to said roller and so connected to the nut that it operates at all times to maintain said roller in, or to press it toward, the reduced portion of said recess, said spring being so located in said nut that it may yield in either direction, when the nut is on a bolt, to an extent that will permit its movement with said roller along said recess to either side of said reduced portion.

5. A nut having the usual threaded bolt receiving opening and having a recess extending along the thread thereof, said recess having between deeper portions a portion of reduced depth, a locking roller of a diameter greater than the depth of the reduced portion of said recess, and a spring comprising a strip of resilient metal having one end fixed in the nut and its free end connected to the roller and operating to maintain said roller normally in the reduced portion of the recess, said spring extending along said recess and being curved about said opening and so spaced both from the bottom of the recess and from said opening, that it may yield in either direction, when the nut is on a bolt, to an extent to permit its movement with said roller along said recess to either side of said reduced portion.

ARNOLD HEINRICH WEGENER.

Copies of this patent may be obtained for five cents each, by addressing the "Commissioner of Patents, Washington, D. C."